United States Patent
Mure et al.

(10) Patent No.: US 8,180,226 B2
(45) Date of Patent: May 15, 2012

(54) OPTICAL RECEIVER

(75) Inventors: Masahito Mure, Chiyoda-ku (JP);
Masahide Miyachi, Chiyoda-ku (JP);
Kaoru Higuma, Chiyoda-ku (JP);
Norikazu Miyazaki, Chiyoda-ku (JP);
Toshio Kataoka, Chiyoda-ku (JP);
Hiroyuki Sato, Sapporo (JP); Hiroshi Nagaeda, Sapporo (JP); Noriyasu Shiga, Sapporo (JP); Yoichi Oikawa, Sapporo (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 168 days.

(21) Appl. No.: 12/661,884

(22) Filed: Mar. 25, 2010

(65) Prior Publication Data

US 2011/0052212 A1 Mar. 3, 2011

(30) Foreign Application Priority Data

Mar. 27, 2009 (JP) ................. 2009-080319

(51) Int. Cl.
*H04B 10/06* (2006.01)
(52) U.S. Cl. ........ 398/202; 398/205; 398/212; 398/208; 398/65; 398/152; 398/188; 398/158

(58) Field of Classification Search ......... 398/202, 398/203, 204, 205, 206, 207, 208, 209, 212, 398/213, 214, 183, 188, 141, 158, 159, 135, 398/136, 128, 130, 138, 139, 79, 161, 65, 398/152
See application file for complete search history.

(56) References Cited

U.S. PATENT DOCUMENTS

| 7,623,796 B2 * | 11/2009 | Liu ................. 398/202 |
| 7,751,721 B2 | 7/2010 | Hoshida et al. |
| 2006/0171718 A1 | 8/2006 | Hoshida |
| 2009/0074428 A1 * | 3/2009 | Liu ................. 398/208 |
| 2010/0189437 A1 | 7/2010 | Hoshida |

FOREIGN PATENT DOCUMENTS

| JP | 2006-211538 A | 8/2006 |
| JP | 2006-295603 A | 10/2006 |
| JP | 2007-158852 A | 6/2007 |
| JP | 2010-087900 A | 4/2010 |
| WO | WO 2009/035513 A1 | 3/2009 |

* cited by examiner

*Primary Examiner* — Hanh Phan
(74) *Attorney, Agent, or Firm* — Chapman and Cutler LLP

(57) ABSTRACT

The present invention relates to an optical receiver, and particularly, to an optical receiver by which a DQPSK-modulated optical signal is demodulated to a multilevel phase-modulated signal.

2 Claims, 4 Drawing Sheets

OPTICAL RECEIVER

CROSS-REFERENCE TO RELATED APPLICATION

The present application claims priority to Japanese Application JP2009-080319 filed on Mar. 27, 2009, the contents of which are hereby incorporated by reference into this application, in their entirety.

BACKGROUND OF THE INVENTION

1. Field of the Invention

The present invention relates to an optical receiver, and particularly, to an optical receiver by which a DQPSK-modulated optical signal is demodulated to a multilevel phase-modulated signal.

2. Description of Related Art

As communication traffic increases, a multilevel modulation/demodulation coding technology is under consideration for a next-generation long-range optical communication system demanding high speed and high capacity. As a representative example, a differential quadrature phase shift keying (DQPSK) scheme has been introduced. The DQPSK scheme has a narrower signal frequency band in comparison with an existing on-off keying (OOK) scheme. In addition, it is anticipated that it is possible to improve frequency efficiency, extend transmission distance, or obtain high sensitivity.

First, in the quadrature phase shift keying (QPSK) modulation scheme, $\theta$, $\theta+\pi/2$, $\theta+\pi$, and $\theta+3\pi/2$ are allocated to each symbol 00, 01, 11, and 10 obtained from two-bit data, where $\theta$ denotes any phase. A receiver recovers transmission data by detecting a phase of the received signal. As a method of relatively readily implementing the QPSK modulation scheme, a DQPSK modulation scheme has been introduced, in which a phase-change amount (0, $\pi/2$, $\pi$, and $3\pi/2$) of a carrier wave between a symbol value previously transmitted and a symbol value subsequently transmitted corresponds to two bits of the transmission information. Therefore, the receiver can recover transmission data by detecting a phase difference between two contiguous symbols.

As disclosed in Japanese Unexamined Patent Application Publication Nos. 2006-295603 and 2007-158852, in order to demodulate the DQPSK-modulated optical signal, it is necessary to provide two delayed interferometers for generating an I (In-phase) signal and a Q (Quadrature) signal (in other words, a delayed interferometer of waveguides 102 and 103 or a delayed interferometer of waveguides 104 and 105) shown in FIG. 1, and demodulate the phase difference with a high accuracy. In FIG. 1, the optical signal beam $\alpha$ is branched into two light beams by a branch unit 101 in order to input them to two delayed interferometers. However, due to influences from the atmospheric temperature of the optical receiver, an optical path length within the delayed interferometer is changed, and the phase is hardly stabilized, which makes it difficult to achieve a high-accuracy demodulation. In addition, it may be impossible to identify which interferometer demodulates which signal component. It is also necessary to optimally adjust a difference between the optical path lengths after the optical signal is branched into two light waves until arriving at the two interferometers or a difference of the optical path lengths included in each interferometer. This may make a control system significantly complicated. Furthermore, the I or Q signal can be obtained by inputting light waves a1 and a2 or a3 and a4 into corresponding balanced photo-sensitive elements.

In order to solve the aforementioned problems, in Japanese Patent Application No. 2008-255528, the applicant proposed an optical receiver based on a polarization surface as shown in FIG. 2. Specifically, the DQPSK modulation light beams a are incident to a one-bit delay circuit with the polarization surfaces being aligned in a single direction. The one-bit delay circuit includes polarization-maintaining type fiber couplers 1 and 2 and a half wavelength plate 3 which rotates the polarization surface by 90° across the path of one of the branched light beams. As a result, the multiplexed light waves are synthesized such that the polarization surfaces of two signal light beams delayed by one bit are perpendicular to each other.

Then, the two signal light beams are separated into four signal light beams using a polarization separation circuit 4, and, for example, light waves b1 and b2 or b3 and b4 are incident to corresponding balanced photo-sensitive elements, thereby obtaining the I or Q signal. As a result, the one-bit delay circuits can be integrated into a single one, and it is possible to reduce manufacturing cost and awkwardness when adjusting optical components.

However, if the one-bit delay circuit is manufactured using, for example, a polarization-maintaining type fiber coupler, which is very sensitive to disturbances such as a temperature change or an external stress, device stability may be insufficiently guaranteed. Also in a case where a spatial optical system such as a half mirror, which has a polarization dependency, is employed, error may be easily generated across the optical path length of the branched light wave, and it is highly probable that a temporal difference will be generated between the I and Q component signals.

SUMMARY OF THE INVENTION

The present invention is contrived to solve the aforementioned problems and provide a polarization-independent optical receiver capable of demodulating a DQPSK-modulated optical signal to a multilevel phase-modulated signal.

According to a first aspect of the invention, there is provided an optical receiver which demodulates a DQPSK-modulated optical signal into a multilevel phase-modulated signal, comprising: a polarization branch unit that branches the DQPSK-modulated optical signal into two light waves A and B of which polarization surfaces are perpendicular to each other; a branch rotation unit that further branches the branched light wave A into two light waves A1 and A2 and transmits the two light waves A1 and A2 through a +45° quarter wavelength plate; the other branch rotation unit that further branches the other branched light wave B into two light waves B1 and B2 and transmits the two light waves B1 and B2 through a −45° quarter wavelength plate; one-bit delay circuit unit that separates each of the four light waves A1, A2, B1, and B2 transmitted through each of the branch rotation unit into two light waves of which polarization surfaces are perpendicular to each other, generates a one-bit delay in one of the separated light waves and multiplexes both the light waves while the polarization surfaces of both the separated light waves are perpendicular to each other; rotation branch unit that passes each of the two light waves A1 and B2 from the one-bit delay circuit unit through a −45° quarter wavelength plate, further rotates their polarization surfaces by 22.5°, and branches each of the light waves into two light waves A11 and A12 or B21 and B22 of which polarization surfaces are perpendicular to each other; the other rotation branch unit that passes each of the other two light waves A2 and B1 from the one-bit delay circuit unit through a +45° quarter wavelength plate, further rotates their polarization surfaces by 22.5°, and branches each of the light waves into two light waves A21 and A22 or B11 and B12 of which polarization surfaces are perpendicular to each other; and a light wave multiplexing unit that transmits four light waves B11, B12, B21, and B22 from the rotation branch units through a +45° half wavelength plate, and thereafter multiplexes eight light waves A11, A12, A21, A22, B11, B12, B21, and B22 into particular combinations (A11, B21), (A12, B22), (A21, B11) or (A22, B12) while polarization surfaces are maintained.

According to the second aspect of the invention, it is preferable that the one-bit delay circuit unit for the four light waves includes a polarization beam splitter and two prism mirrors.

According to the first aspect of the invention, it is possible to obtain the I-signal component and the Q-signal component that are polarization-independent by branching the DQPSK-modulated optical signal into two light waves of which polarization surfaces are perpendicular to each other, generating the I-signal component and the Q-signal component using the polarization surface from each of the light waves as described above, extracting corresponding light waves from each polarization surface, and multiplexing them into particular combinations.

According to the second aspect of the invention, since the one-bit delay circuit unit for four light waves includes a single polarization beam splitter and two prism mirrors, it is possible to provide an optical receiver capable of reducing the size of the spatial optical system.

DETAILED DESCRIPTION OF THE INVENTION

Figure 1:
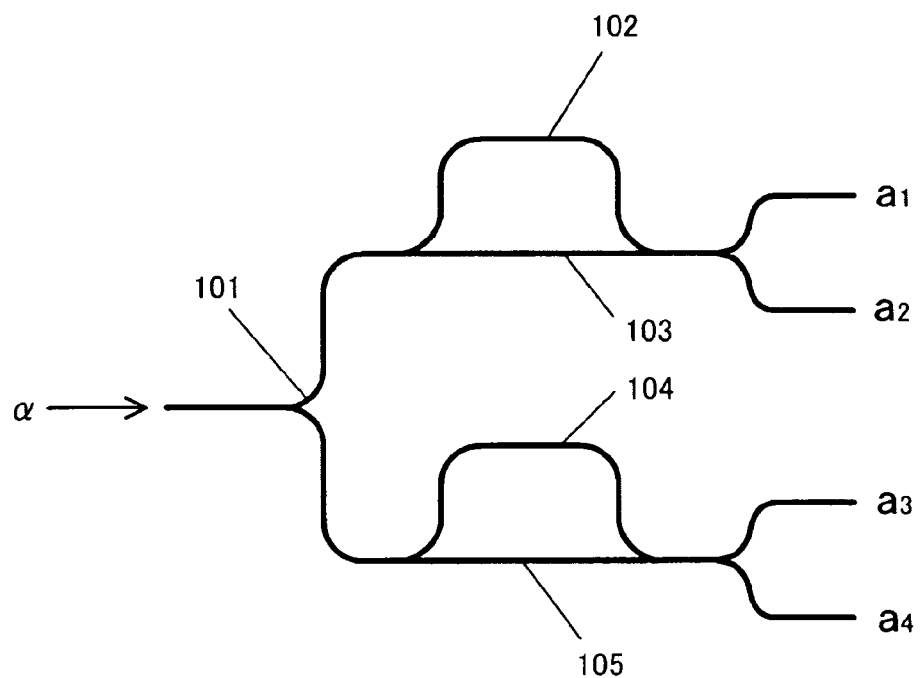
FIG. 1 illustrates a DQPSK-modulation optical receiver including two delayed interferometers of the related art.
Figure 2:
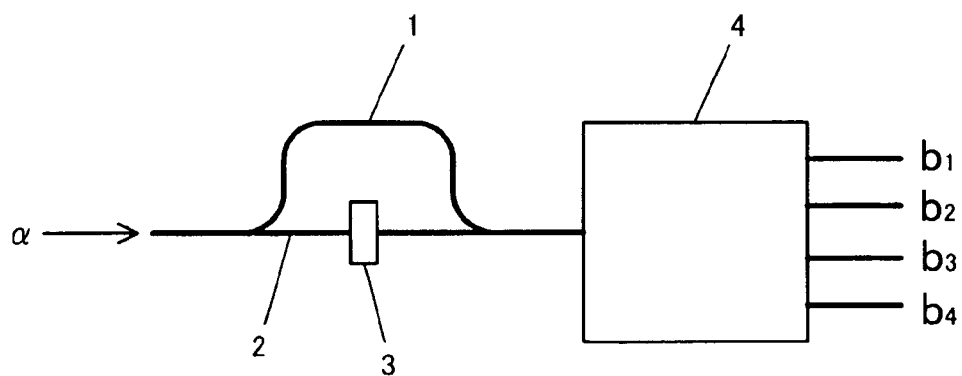
FIG. 2 illustrates a DQPSK-modulation optical receiver based on a polarization surface that the applicants proposed in a prior application.
Figure 3:
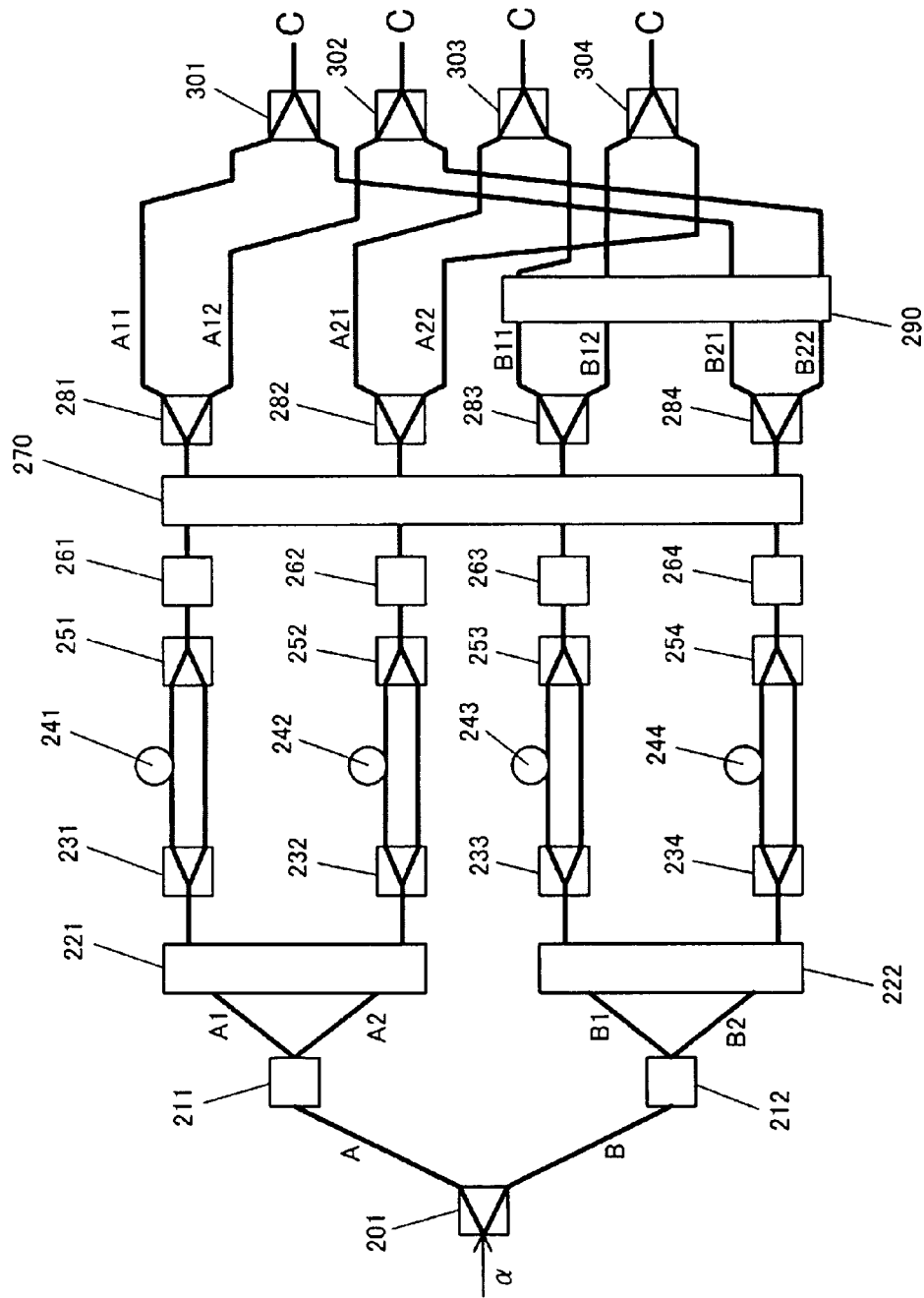
FIG. 3 illustrates a basic concept regarding an optical receiver according to an embodiment of the invention.

Hereinafter, an optical receiver according to an embodiment of the invention will be described in detail. As shown in FIG. 3, according to an embodiment of the invention, an optical receiver which demodulates a DQPSK-modulated optical signal a into a multilevel phase-modulated signal includes: a polarization branch unit 201 that branches the DQPSK-modulated optical signal a into two light waves A and B of which polarization surfaces are perpendicular to each other; a branch rotation unit 211 and 221 that further branches the branched light wave A into two light waves A1 and A2 and transmits the light waves A1 and A2 through a +45° quarter wavelength plate; the other branch rotation unit 212 and 222 that further branches the other branched light wave B into two light waves B1 and B2 and transmits the light waves B1 and B2 through a −45° quarter wavelength plate; one-bit delay circuit unit 231 to 254 that separates each of the four light waves A1, A2, B1, and B2 transmitted through each of the branched rotation unit into two light waves of which polarization surfaces are perpendicular to each other, generates a one-bit delay in one of the separated light waves and multiplexes both the light waves while the polarization surfaces of both the separated light waves are perpendicular to each other; rotation branch unit that passes each of the two light waves A1 and B2 from the one-bit delay circuit unit through a −45° quarter wavelength plate 261 and 264, further rotates their polarization surfaces by 22.5° in mark 270, and branches each of the light waves into two light waves A11 and A12 or B21 and B22 of which polarization surfaces are perpendicular to each other in marks 281 and 284; the other rotation branch unit that passes each of the remaining two light waves A2 and B1 from the one-bit delay circuit unit through a +45° quarter wavelength plate 262 and 263, further rotates their polarization surfaces by 22.5° in mark 270, and branches each of the light waves into two light waves A21 and A22 or B11 and B12 of which polarization surfaces are perpendicular to each other in marks 282 and 283; and light wave multiplexing unit 301 to 304 that transmits four light waves B11, B12, B21, and B22 from the rotation branch unit through a +45° half wavelength plate 290, and thereafter multiplexes eight light waves A11, A12, A21, A22, B11, B12, B21, and B22 into particular combinations (A11, B21), (A12, B22), (A21, B11) or (A22, B12) while polarization surfaces are maintained.

Each of the light waves C1 to C4 obtained using such an optical system can produce the I-signal component and the Q-signal component that are polarization-independent. Even when a half mirror is used in an optical system of an optical receiver, it is possible to obtain the appropriate I-signal component and Q-signal component without being influenced by the polarization dependency of the half mirror.

Figure 4:
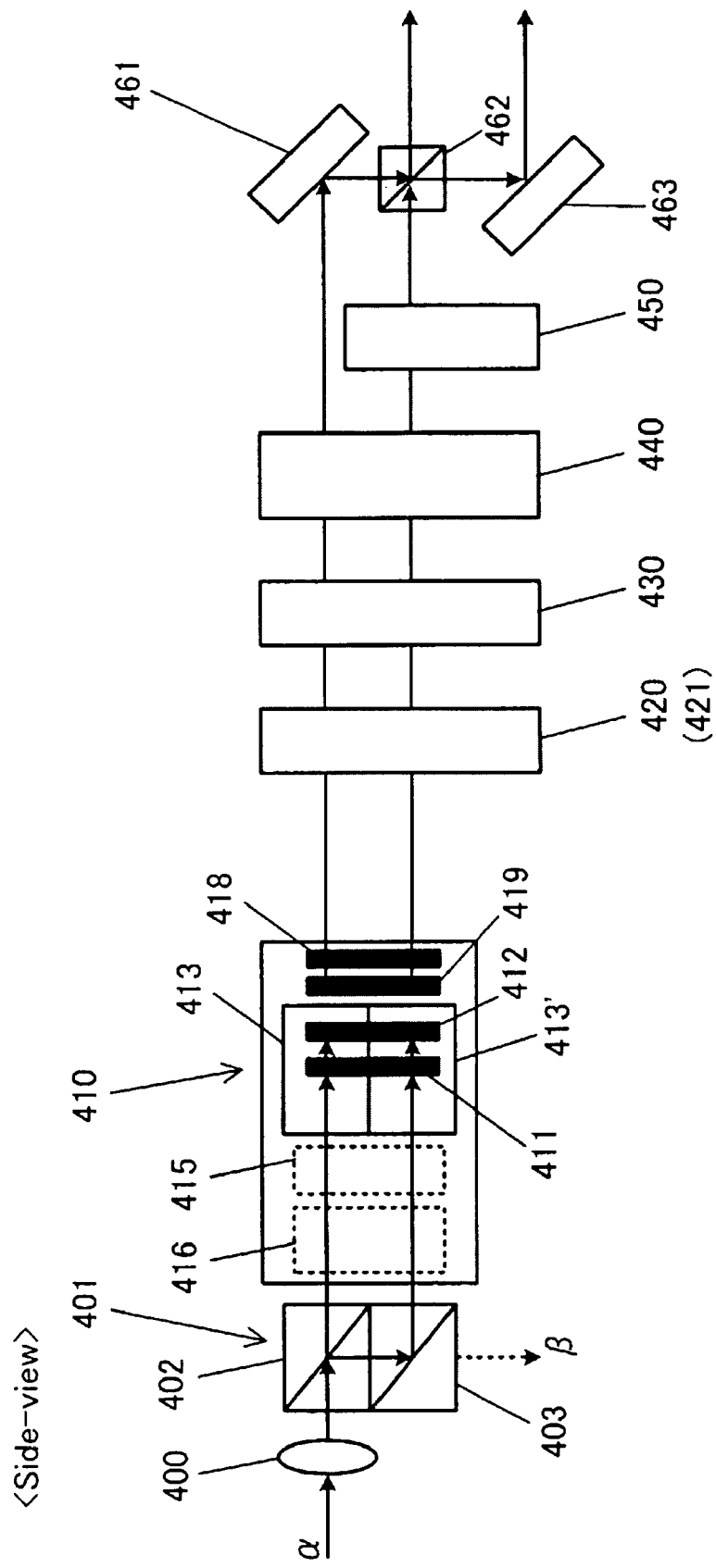
FIG. 4 is a side development view illustrating a spatial optical system of the optical receiver according to an embodiment of the invention.
Figure 5:
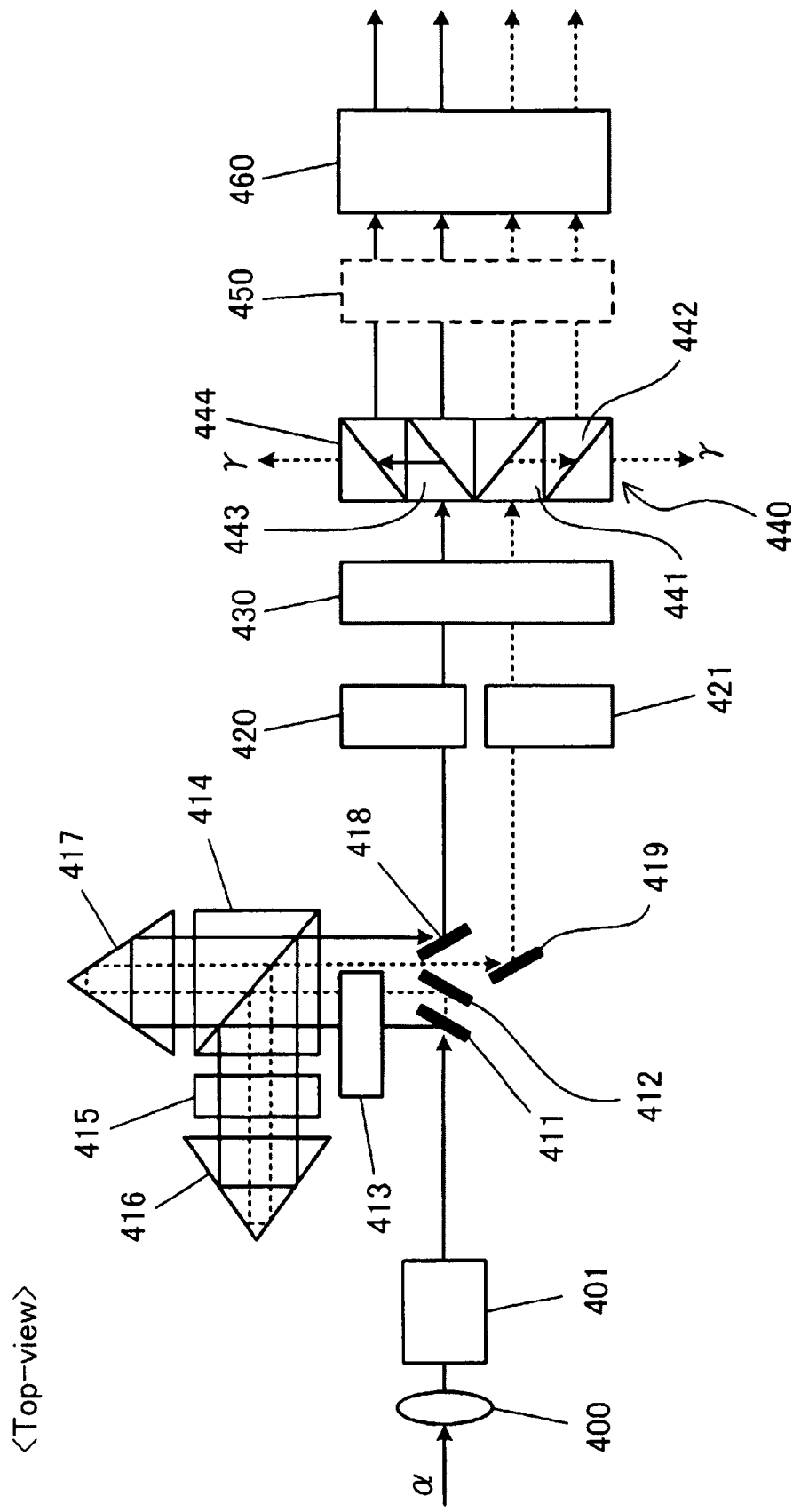
FIG. 5 is a top-plan development view illustrating a spatial optical system of the optical receiver according to an embodiment of the invention.

Next, an optical receiver including an optical system corresponding to FIG. 3 will be described with reference to FIGS. 4 and 5. FIGS. 4 and 5 are development diagrams obtained by developing optical components in series in a light propagation direction (toward the right side of the drawing). Particularly, FIG. 4 is a development diagram as seen from the side of a spatial optical system, and FIG. 5 is a development diagram as seen from the top of the spatial optical system.

The incident signal light beams α are collimated by the lens 400 and incident to the polarization beam splitters 402 and 403 included in the polarization branch unit 401 to form parallel light beams A and B separated vertically, as shown in FIG. 4. The light wave denoted by a reference symbol β is a leakage light leaking from the polarization beam splitter. An optical system including the ±45° quarter wavelength plate and the one-bit delay circuit is denoted by a reference numeral 410. A light beam is set to pass through a half mirror 411 and a mirror 412 shown in FIG. 5 in order to arrive at this optical system 410. The light wave A or B can be divided into two light waves ((the solid line A1 and the dotted line A2) or (B1 and B2)) having a light intensity of 3 dB using the half mirror 411.

The light waves A1 and A2 illustrated at the top of FIG. 4 are incident to the +45° quarter wavelength plate 413, and the light waves B1 and B2 illustrated at the bottom of FIG. 4 are incident to the −45° quarter wavelength plate 413'. Then, each of these four light waves are branched at the polarization beam splitter 414 into two light waves of which polarization surfaces are perpendicular to each other, reflected at prism mirrors 416 and 417, re-incident to the polarization beam splitter 414, and multiplexed while the polarization surfaces are maintained in a perpendicular state. Furthermore, installation positions of the prism mirrors 416 and 417 with respect to the polarization beam splitter 414 are set such that the optical path difference becomes a single bit. For example, in order to adjust the optical length, an optical transmission medium 415 such as a polymer is arranged between the polarization beam splitter and the prism mirror.

In the optical receiver according to an embodiment of the invention, particularly, it is possible to remarkably reduce the size of the spatial optical system because each of the one-bit delay circuits for four light waves includes a single polarization beam splitter 414 and two prism mirrors 416 and 417.

The light wave output from the one-bit delay circuit is guided by the mirrors 418 and 419 to a −45° quarter wavelength plate 420 or a +45° quarter wavelength plate 421.

Each of the four light waves transmitted through the ±45° quarter wavelength plates 420 and 421 is further transmitted through 22.5° polarization surface rotation unit 430 and branched into two light waves by a branch unit 440 including four polarization beam splitter 441 to 444. The reference symbol γ denotes a leakage light beam leaking from the polarization beam splitter.

The light waves B11, B12, B21, and B22 illustrated in the bottom of FIG. 4 are transmitted through a +45° half wavelength plate 450, so that the light waves illustrated in the top and the light waves illustrated in the bottom of FIG. 4 are coupled to particular combinations by the multiplexing unit 460 including a mirror 461, a polarization beam splitter 462, or a mirror 463 (if necessary).

As shown in FIG. 5, an optical path difference is generated when a spatial optical system is used. Since such an optical path difference causes a phase difference between light waves, it is necessary to provide correction to prevent an optical path difference from being generated between light waves.

As described above, according to the present invention, it is possible to provide a polarization-independent optical receiver capable of demodulating a DQPSK-modulated optical signal to a multilevel phase-modulated signal.

What is claimed is:

1. An optical receiver which demodulates a DQPSK-modulated optical signal into a multilevel phase-modulated signal, comprising:
    a polarization branch unit that branches the DQPSK-modulated optical signal into two light waves A and B of which polarization surfaces are perpendicular to each other;
    a first branch rotation unit that further branches the branched light wave A into two light waves A1 and A2 and transmits the two light waves A1 and A2 through a +45° quarter wavelength plate;
    a second branch rotation unit that further branches the branched light wave B into two light waves B1 and B2 and transmits the two light waves B1 and B2 through a −45° quarter wavelength plate;
    a one-bit delay circuit unit that separates each of the four light waves A1, A2, B1, and B2 transmitted through each of the branch rotation units into two light waves of which polarization surfaces are perpendicular to each other, generates a one-bit delay in one of the separated light waves and multiplexes both the separated light waves while the polarization surfaces of both the separated light waves are perpendicular to each other;
    a first rotation branch unit that passes each of the two light waves A1 and B2 from the one-bit delay circuit unit through a −45° quarter wavelength plate, further rotates their polarization surfaces by 22.5°, and branches each of the light waves A1 and B2 into two light waves A11 and A12, and B21 and B22, respectively, of which polarization surfaces are perpendicular to each other;
    a second rotation branch unit that passes each of the other two light waves A2 and B1 from the one-bit delay circuit unit through a +45° quarter wavelength plate, further rotates their polarization surfaces by 22.5°, and branches each of the light waves A2 and B1 into two light waves A21 and A22, and B11 and B12, respectively, of which polarization surfaces are perpendicular to each other; and
    a light wave multiplexing unit that transmits four light waves B11, B12, B21, and B22 from the rotation branch units through a +45° half wavelength plate, and thereafter multiplexes eight light waves A11, A12, A21, A22, B11, B12, B21, and B22 into particular combinations (A11, B21), (A12, B22), (A21, B11) and (A22, B12) while polarization surfaces are maintained.

2. The optical receiver according to claim 1, wherein the one-bit delay circuit unit for the four light waves A1, A2, B1, and B2 includes a polarization beam splitter and two prism mirrors.

* * * * *